United States Patent [19]

Johansson et al.

[11] Patent Number: 5,801,204
[45] Date of Patent: Sep. 1, 1998

[54] METHOD OF RECLAIMING WASTE PLASTIC MATERIAL AND A COMPOUND INCLUDING WASTE PLASTIC MATERIAL

[75] Inventors: Jan-Erik Johansson, Raisio; Jaakko Paatero, Turku, both of Finland

[73] Assignee: Raisio Chemicals Oy, Raisio, Finland

[21] Appl. No.: 776,102

[22] PCT Filed: Jul. 3, 1995

[86] PCT No.: PCT/FI95/00383

§ 371 Date: Jan. 21, 1997

§ 102(e) Date: Jan. 21, 1997

[87] PCT Pub. No.: WO96/02590

PCT Pub. Date: Feb. 1, 1996

[30] Foreign Application Priority Data

Jul. 19, 1994 [FI] Finland .................................. 943413

[51] Int. Cl.$^6$ ................................................ C08J 11/04
[52] U.S. Cl. .......................... 521/41; 524/59; 524/62
[58] Field of Search .............................. 521/41; 524/59, 524/62

[56] References Cited

U.S. PATENT DOCUMENTS 4,018,722   4/1977   Baker ................................. 260/23
5,226,926   7/1993   Matsuzaki ........................... 44/530
5,226,927   7/1993   Rundstrom .......................... 48/76

FOREIGN PATENT DOCUMENTS

| 0 568 757 A1 | 11/1993 | European Pat. Off. . |
| 85873 | 2/1992 | Finland . |
| 90435 | 10/1993 | Finland . |
| 43 11 181A1 | 10/1994 | Germany . |
| 9300406 | 1/1993 | WIPO . |
| WO 93/00406 | 1/1993 | WIPO . |

*Primary Examiner*—Edward J. Cain
*Attorney, Agent, or Firm*—Nixon & Vanderhye P.C.

[57] ABSTRACT

Waste plastic material is treated so as to make possible its utilization as a binder component in road surfacing materials, as a fuel, or for other desirable purposes. The waste plastic material is made at least partially fluid by mixing it with a solvent. The solvent is waste fats produced in refining or by treating animal and/or vegetable fats, crude fatty acids obtained as byproducts of refining fats, or fatty acids or pitch obtained by distilling hydrolyzed fats. The solvent is typically mixed with waste plastic material in the ratio of less than 1:2, preferably about 1:3, and at a temperature of between about 150°–250° C.

30 Claims, No Drawings

METHOD OF RECLAIMING WASTE PLASTIC MATERIAL AND A COMPOUND INCLUDING WASTE PLASTIC MATERIAL

CROSS-REFERENCE TO RELATED APPLICATION

This is a U.S. National Phase of International Appln. No. PCT/FI95/00383 filed Jul. 3, 1995 and claiming priority of Finnish applicatin 943413 filed Jul. 19, 1994.

BACKGROUND AND SUMMARY OF INVENTION

The object of the present invention is a method for treating waste plastic material, such as polyethene, polyamide, polystyrene, PVC, acrylic and PET plastic material contained in reclaimed waste, so as to make possible its utilisation, for example, as a binder component in road surfacing materials or as fuel.

The invention also relates to a road surfacing material binder composition and a fuel composition in fluid form.

For reasons of environmental protection and energy saving, the aim is to reclaim and re-use waste plastic such as packaging materials and industrial waste plastic. In some cases, thermoplastics can be re-used subsequent to a purification process. In most cases, however, plastic is waste which is used for suitable applications as filler material or fuel.

It has previously been suggested that plastic be used in road surfacings to improve their quality, for example, for reinforcement. It has also been suggested that waste plastic be finely shredded and mixed as such with bitumen, as an emulsified aqueous solution with emulsion bitumen, or dissolved with solvents and mixed with bitumen.

It is very difficult to mix finely shredded waste plastic evenly in bitumen. The plastic mixes incompletely or is distributed unevenly in the composition, which makes the binder composition difficult to handle and the desired reinforcement of the road surfacing is not achieved.

The plastic can be distributed, or dispersed, evenly in the bitumen through dissolving. However, the solvents that have previously been suggested for use have their drawbacks—many are toxic, some cause the properties of bitumen to deteriorate or the amounts required are relatively large.

Finnish patent application FI 922455 proposes the use of tall resin, wood resin, gum rosin, tall oil or their derivatives as solvents in dispersing waste plastic in bitumen. These substances are, however, required in relatively large amounts to achieve the desired solvent effect.

It has previously also been suggested that waste plastic be burned. However, feeding and dosing finely shredded waste plastic into an incineration plant is difficult. Feeding waste plastic requires its own feeding apparatus and it cannot be used, for example, as fuel for an oil boiler.

The aim of the present invention is to overcome the above problems.

The aim is especially to provide a method by means of which waste plastic can be made a more suitable component of bitumen-based or similar road surfacing materials and/or fuel.

A further aim of the invention is to provide an improved binder composition containing waste plastic, as compared to those presented above, for use as a binder in road surfacing material.

A still further aim of the invention is to provide a new liquid fuel composition containing waste plastic.

To achieve the aims presented above, the method, the binder composition and the fuel composition relating to the invention are characterized by what is defined in the claims presented below.

DETAILED DESCRIPTION OF THE INVENTION

By means of the method relating to the invention, waste plastic material is made at least partly fluid by mixing with it a solvent consisting mainly of animal and/or vegetable fats;

waste fats produced in refining animal and/or vegetable fats or other products such as crude fatty acids obtained as by-products in refining fats, or fatty acids or pitch obtained in distilling hydrolysed fats;

synthetic fatty acids or fatty acid compositions, or mixtures of the above.

In the method relating to the invention, natural fats or the fatty acids or other constituents formed in refining them are used as the solvent or dispersing agent of the waste plastic material for dispersing the waste plastic, for example, in bitumen or fuel oil.

By-products or waste produced by the food industry or in processing or refining food products or food product raw materials can often by used as solvents in the method relating to the invention. The invention thus makes possible the utilisation of waste.

Especially animal and/or vegetable fats or natural substances closely related to them that are obtained as the main product or by-product of refining, hydrolysing, distilling or treating fats in another similar manner can be used in the method relating to the invention.

Natural fats are triglyceride compositions which also contain free fatty acids, waxes, and other substances.

The solvent relating to the invention can be formed of animal fats which include, for example:

beef or mutton tallow, which contain mainly the most common fatty acids, namely oleic, palmitine and stearine acids;

hog fat which, like tallow, contains the most common fatty acids, mostly oleic acid;

train oils and fish oils, that is, fats obtained from marine animals, which are mainly liquid, and waste fats recovered from the fur industry and slaughterhouses, destruction fats.

The solvent relating to the invention can be formed of vegetable fats which include, for example:

soybean oil, that is, the oil obtained from soybeans. Soybean oil is an important raw material of the margarine industry, as well as of other sectors of the food industry.

rapeseed oil, which is also an important raw material of the food industry, such as the margarine industry.

sunflower oil, which is made of sunflower seeds, contains large amounts of linoleic acid triglycerides.

cottonseed oil.

palm oil and palm kernel oil.

coconut oil and coconut butter. The butter contains large amounts of laurin and myristic acid triglycerides.

Vegetable fats mainly contain triglycerides of unsaturated fatty acids and are thus oily. Palm kernel oil and coconut butter are, however, solid.

Fats and fatty acids in fluid form can often be used as such as the solvent relating to the invention. Even used vegetableoil-based hydraulic oil or the frying/deep frying oils used, for example, in hamburger restaurants can be used as the solvent oil relating to the invention, possibly after some purification and filtering.

The crude fatty acid produced as a by-product of refining fats, distilling or treating fatty acids with an alkali is particularly well suited for use as the solvent relating to the invention. Fats to be refined often contain 1–5% of free fatty acids which are removed from the fat in connection with refining, for example, before producing food oils.

On the other hand, the fatty acids formed during the splitting/hydrolysis of, for example, destruction fats (=fats obtained from the fur industry and slaughterhouses) or of other fats at a high temperature and under high pressure in an autoclave are also well suited for use as the solvent relating to the invention. It is obviously particularly advantageous to use the pitch or other similar waste or by-product formed in the distillation of these fatty acids as the solvent, if it has no other use.

In general, it could be said that it is preferable to use as the solvent relating to the invention fats, fatty acids or the like which originate in natural fats having fatty acid hydrocarbon chains of $C_{10}$–$C_{22}$ and the hydrocarbon chains of which contain an even number of carbon molecules.

Synthetic fatty acids may obviously also be considered for use as a solvent in the method relating to the invention.

The fat or fatty acid or fatty acid derivative acts as a medium for mixing the plastic evenly in the bitumen, to obtain a binder or fuel of uniform quality.

It seems that particularly mixtures of fatty acids and triglycerides have an advantageous effect on the fluidity of the plastic composition and its penetration, for example, into bitumen. Natural fats contain triglycerides.

Tests show that plastic containing 95% polyethene and 5% polyamide can be mixed completely with bitumen BIT800 at a temperature of 200° C., when the composition is as follows: 86% bitumen, 10% plastic and 4% fat/fatty acid mixture.

A test has also shown that considerably less fat/fatty acid composition originating from natural fats is required, for example, to disperse plastic in bitumen than the amount of tall resin required to achieve the same effect. Tests show that the following are required to produce a fluid plastic composition:

|  | Test 1 % | Test 2 % |
| --- | --- | --- |
| fat/fatty acid | 4 | — |
| tall resin | — | 10 |
| plastic composition | 12 | 12 |
| bitumen | 84 | 78 |
| fatty acid/plastic | 1:3 | 1:1.2 |

That is, only one part of the fat/fatty acid composition is required to three parts of plastic. Tall resin is required in almost the same amount as plastic.

It is usually preferable to first add ground plastic material to bitumen and only after that add the fat/fatty acid composition to this mixture at an elevated temperature. The fat/fatty acid composition is added at a temperature of 150° C. to 250° C., preferably at >200° C. If desired, the solvent may of course first be mixed with the plastic and then this partly fluid composition with bitumen.

The method relating to the invention, therefore, has the following advantages:

by means of the method, waste plastic can be made at least partly fluid;

waste plastic can easily be dispersed (dissolved) in bitumen or the like;

fat/fatty acids facilitate the penetration of the plastic into bitumen or the like;

the waste plastic/fat/fatty acid composition improves the adhesion of bitumen or the like to mineral aggregate, and waste plastic can be utilised as fuel, for example, in winter, when it cannot be used for road surfacing.

Generally speaking, the overall advantage of the invention is obviously that it promotes the utilisation of both waste plastic and waste fats and by-products of the fat industry. By means of the method relating to the invention, for example, the plastic contained in plastic-coated packaging materials of the food industry, such as milk cartons, can be re-used as binder or fuel.

A solvent based on natural fats is in addition an environment-friendly, renewable natural resource. Furthermore, fats do not form sulphur dioxide when burned.

The invention is not limited to the above methods and substances which serve as examples, but can be broadly applied within the scope of the inventive idea defined in the appended claims.

We claim:

1. A method of forming a road surfacing material binder comprising the steps of:
   (a) dissolving waste plastic material in a solvent which mainly comprises (a1) waste fats produced in refining or treating one or more of vegetable fat and animal fat, (a2) crude fatty acids obtained as by-products of refining fats, (a3) fatty acids or pitch obtained by distilling hydrolyzed fats, and (a4) mixtures of (a1)–(a3); and
   (b) incorporating the solvent and waste plastic material from step (a) with a road surfacing material binder, suitable for use in road surfacing.

2. A method as recited in claim 1 wherein step (b) is practiced by incorporating the solvent and waste plastic in bitumen, and evenly mixing the solvent, waste plastic, and bitumen together to form a road surfacing material binder of uniform quality.

3. A method as recited in claim 1 comprising the further step, prior to step (a), of finely grinding the waste plastic material.

4. A method as recited in claim 3 wherein step (b) is practiced using solvent at a temperature of 150° C. to 250° C.

5. A method as recited in claim 1 wherein step (b) is practiced using solvent at a temperature over 200° C.

6. A method as recited in claim 2 wherein step (b) is practiced to form a road surfacing material binder comprising about 86% bitumen, and about 10% waste plastic and about 4% solvent from step (a).

7. A method as recited in claim 1 wherein steps (a) and (b) are practiced by mixing solvent and waste plastic material in a ratio of greater than 1:2.

8. A method as recited in claim 1 wherein step (a) is practiced by using as a solvent vegetable-based substances which are produced as waste or by-products of the food industry and which contain components originating in vegetable fats.

9. A method as recited in claim 1 wherein step (b) is practiced by mixing the liquid solution from step (a) at an elevated temperature with bitumen or asphalt.

10. A method as recited in claim 1 wherein step (a) is practiced by using one or both of fatty acids and pitch formed in connection with the hydrolysis of fats and the distillation following it, as a solvent.

11. A method as recited in claim 1 wherein step (a) is practiced by using crude fatty acids formed in connection with distillation related to the refining of fats as a solvent.

12. A method as recited in claim 1 wherein step (a) is practiced by using crude fatty acids formed in connection with the alkali refining of fats as the solvent.

13. A method as recited in claim 1 wherein step (a) is practiced by using waste deep frying oil produced in the food industry as a solvent.

14. A method as recited in claim 1 wherein step (a) is practiced by using beef tallow, hog's fat, fish oil, or waste fats of the fur industry, as the solvent.

15. A method as recited in claim 1 wherein step (a) is practiced using one or more of waste polyethene, polyamide, polystyrene, polyvinyl chloride, acrylic, and PET as the waste plastic material.

16. A method as recited in claim 3 wherein step (a) is practiced using waste plastic containing paper or plastic containing board as the waste plastic material.

17. A method as recited in claim 2 wherein steps (a) and (b) are practiced by mixing the waste plastic material with the bitumen, and then mixing the solvent from step (a) with the bitumen and waste plastic material.

18. A method as recited in claim 17 wherein steps (a) and (b) are practiced at a temperature of over 200° C.

19. A method of forming a fuel, comprising the steps of:
    (a) dissolving waste plastic material in a solvent which mainly comprises (a1) waste fats produced in refining or treating one or more of vegetable fat and animal fat, (a2) crude fatty acids obtained as by-products of refining fats, (a3) fatty acids or pitch obtained by distilling hydrolyzed fats, and (a4) mixtures of (a1)–(a3); and
    (b) incorporating the waste plastic and solvent from step (a) in a liquid fuel, capable of being readily burned to produce heat energy.

20. A method as recited in claim 19 wherein steps (a) and (b) are practiced by adding the solvent and waste plastic to liquid fuel oil.

21. A method as recited in claim 20 wherein the solvent and the waste plastic material are mixed together at a temperature of 200° C.

22. A method as recited in claim 20 wherein step (a) is practiced by using beef tallow, hog's fat, fish oil, or waste fats of the fur industry, as the solvent.

23. A method as recited in claim 20 wherein step (a) is practiced using waste plastic containing paper or plastic containing board as the waste plastic material.

24. A method as recited in claim 20 wherein steps (a) and (b) are practiced by mixing solvent and waste plastic material in a ratio of greater than 1:2.

25. A method as recited in claim 20 wherein step (a) is practiced by using one or more of waste soybean oil, rapeseed oil, sunflower oil, palm and palm kernel oil, and coconut oil, as the solvent.

26. A method of utilizing a fuel, comprising the steps of:
    (a) dissolving waste plastic material in a solvent which mainly comprises (a1) waste fats produced in refining or treating one or more of vegetable fat and animal fat, (a2) crude fatty acids obtained as by-products of refining fats, (a3) fatty acids or pitch obtained by distilling hydrolyzed fats, and (a4) mixtures of (a1)–(a3) to produce a liquid solution; and
    (b) burning the liquid solution, in liquid form, to produce heat energy.

27. A method as recited in claim 26 wherein step (a) is practiced at a temperature of 150° C. to 250° C., and by mixing solvent and waste plastic material in a ratio of greater than 1:2.

28. A liquid solution containing one or more of waste polyethene, polyamide, polystyrene, PVC, acrylic, and PET waste plastic material dissolved in a solvent which mainly comprises (a1) waste fats produced in refining or treating of one or more vegetable fat and animal fat, (a2) crude fatty acids obtained as by-products of refining fats, (a3) fatty acids or pitch obtained by distilling hydrolyzed fats, and (a4) mixtures of (a1)–(a3), the solvent mixed with the waste plastic material in the ratio of greater than 1:2.

29. A liquid fuel as recited in claim 28 further comprising liquid industrial fuel oil.

30. A road surfacing material binder comprising:
    one or more of waste polyethene, polyamide, polystyrene, PVC, acrylic, and PET waste plastic material dissolved in a solvent which mainly comprises (a1) waste fats produced in refining or treating one or more of vegetable fat and animal fat, (a2) crude fatty acids obtained as by-products of refining fats, (a3) fatty acids or pitch obtained by distilling hydrolyzed fats, and (a4) mixtures of (a1)–(a3), the solvent mixed with the waste plastic material being evenly mixed together in the ratio of greater than 1:2; and bitumen or asphalt.

* * * * *